United States Patent [19]

Hahn et al.

[11] Patent Number: 4,621,678
[45] Date of Patent: Nov. 11, 1986

[54] HEAT EXCHANGER APPARATUS FOR EXTRUDING THERMOPLASTIC COMPOSITIONS

[75] Inventors: Granville J. Hahn; Raleigh N. Rutledge, both of Big Spring; Alonzo H. Searl; Walter E. Sommerman, both of Fort Worth, all of Tex.

[73] Assignee: Cosden Technology, Inc., Dallas, Tex.

[21] Appl. No.: 585,658

[22] Filed: Mar. 2, 1984

Related U.S. Application Data

[63] Continuation-in-part of Ser. No. 416,811, Sep. 13, 1982, abandoned.

[51] Int. Cl.[4] .................... F25B 29/00; F28F 27/02; B30B 15/34; B29C 45/72
[52] U.S. Cl. .......................... 165/27; 165/34; 165/100; 165/64; 425/378 R; 425/144; 264/40.6
[58] Field of Search .............. 165/27, 34, 100, 61, 165/63, 64, 65; 425/378 R, 379 R, 144, 4 C; 264/40.6

[56] References Cited

U.S. PATENT DOCUMENTS

| | | | |
|---|---|---|---|
| 2,670,933 | 3/1954 | Bay | 165/27 |
| 3,583,467 | 6/1971 | Bennett | 425/144 |
| 3,729,064 | 4/1973 | Wolf et al. | 165/34 |
| 3,756,312 | 9/1973 | Shah et al. | 165/64 |
| 3,891,370 | 6/1975 | Giehler | 425/144 |
| 3,950,118 | 4/1976 | Adair | 425/379 R |
| 4,216,253 | 8/1980 | Bonnebat et al. | 264/40.6 |

FOREIGN PATENT DOCUMENTS

| | | | |
|---|---|---|---|
| 0055219 | 5/1981 | Japan | 425/144 |
| 0029735 | 6/1983 | Japan | 425/378 R |

*Primary Examiner*—William R. Cline
*Assistant Examiner*—John K. Ford
*Attorney, Agent, or Firm*—Roy L. Van Winkle; M. Norwood Cheairs

[57] ABSTRACT

Disclosed is heat exchange apparatus for controlling the temperature of a resin after leaving an extruder and prior to extrusion through a die in an extrusion process, comprising a heat exchanger having an inlet and outlet for an extruded heat-plastified resin and an inlet and an outlet for a heat exchange medium to be circulated in heat exchanging relationship with the extruded resin; a selective heater for receiving the heat exchange medium from the heat exchanger, the heater heating the heat exchange medium to a predetermined temperature during a start-up phase of the heat exchange device; a cooler adapted for receiving a portion of the heat exchange medium from the heater, the cooler including an inlet and an outlet for the heat exchange medium and an inlet and an outlet for a cooling medium to be circulated in heat exchanging relationship with the heat exchange medium; control means interposed between the heater and the cooler for selectively directing a portion of the heat exchange medium to said cooler in response to a sensed temperature condition and for directing the balance of the heat exchange medium to the heat exchanger; and a pump for circulating the heat exchange medium between the heat exchanger, the heater, and the cooler.

5 Claims, 2 Drawing Figures

HEAT EXCHANGER APPARATUS FOR EXTRUDING THERMOPLASTIC COMPOSITIONS

BACKGROUND OF THE INVENTION

This application is a continuation-in-part of application Ser. No. 416,811, filed Sept. 13, 1982 now abandoned.

The present invention relates to an apparatus for use in the extrusion of thermoplastic compositions and more especially to an apparatus for use in the extrusion of foamed thermoplastic compositions. The apparatus disclosed herein is useful for extruding compositions comprising a major portion of at least one thermoplastic resin which is either amorphous or crystalline in nature.

In the conventional process employed in the plastics industry for extruding thermoplastic compositions, beads or pellets of at least one thermoplastic resin and various other additives are introduced into the feed zone of a screw-type extruder. In the extruder, the thermoplastic resin and additives are heated and mixed to form a substantially homogenous, continuous, flowable composition which is then forced by the screw through an extrusion die to produce a product of the desired shape and dimensions.

As the thermoplastic composition passes through the extruder, its temperature increases significantly due to the combined shear and compressive forces applied to the material by the rotating extruder screw. For a given extruder, the magnitude of the temperature increase varies according to the rotation rate of the extruder screw and the shear properties of the particular thermoplastic composition being run. While some heating is desirable and necessary for achieving satisfactory extrusion, excess heat must be removed from the material downstream of the extruder in order to retain the shape and integrity of the extruded product. Typically, this is done by passing the extrudate, in some cases at slower or lower rates, over chill rolls or through cooling vats downstream of the extrusion die.

Because the temperature of the extrudate exiting the extrusion die is proportional to the rotation rate of the extruder screw when operating under standard conditions (i.e., an increase in throughput causes a higher melt temperature), conventional extrusion lines have been limited as regards their throughput rates by the capacity of the cooling equipment downstream of the extrusion die. Even where the downstream cooling capacity is adequate, the extrudate can undergo thermal shock if its temperature is reduced too rapidly over a wide temperature differential, thereby adversely affecting its mechanical properties.

Particular problems are encountered in the extrusion of foamed thermoplastic compositions. Extruders for foamed thermoplastic compositions are typically run at high pressures to keep the blowing agent condensed until the composition emerges from the extrusion die. If the temperature of the foamed product as it emerges from the extrusion die is significantly greater than that required to achieve satisfactory extrusion, the blowing agent will overexpand once the pressure is relieved, resulting in cell rupture and the loss of dimensional stablity and compositional integrity. If the temperature is too low, expansion will be incomplete and poor density properties will result. For some polymers, such as polyethylene, the correct temperature window is only about ±2° F.

Furthermore, the problem is not only one of achieving a specific absolute temperature, but uniformity of temperature. If temperature gradients exist within the polymer mass, uneven blowing takes place, again causing ruptured cells and poor density values. At high throughputs, the existence of temperature gradients is more likely to occur.

Therefore, in connection with the extrusion of foam products, it is extremely difficult to obtain an increase in throughput for an extrusion line while at the same time not causing a deterioration in the physical properties of the resulting product, such as the size, uniformity and integrity of the cells and the density value of the foamed polymer. In addition, these problems are exacerbated when, as often desired, various additives are incorporated into the foamed product, such as, for example, a fire-retardant.

Several measures have been taken in the past to solve these problems. For example, it is common to employ two separate extruder screws connected in series. See, e.g., U.S. Pat. No. 3,860,220. In this configuration the screw of the second extruder merely acts as an auger to convey the thermoplastic composition through the extruder, which is jacketed and cooled with a circulating cooling medium. However, the use of a second extruder in this capacity has proven to be a very expensive, both from an equipment and an energy standpoint, and an inefficient method for cooling a foamed material. Temperature gradients are actually produced in such a second screw, because heat is generated at the screw, while cooling is applied from the outside. Furthermore, because of the high pressures employed in foam extrusion, problems are often encountered with the rear seals of the second extruder screw. Failure of the rear seals can result in damage to the gear box from the escaping polymer as well as undesirable leakage of the blowing agent.

Another solution is to decrease the rotational speed of the extruder screw; however, this measure is obviously antithetical to an increase in extrusion line throughput.

Other measures have included the inclusion of cooling devices in the downstream portion of the extruder (see, e.g., U.S. Pat. Nos. 3,385,917, 3,151,192, 3,444,283 and 3,658,973 and British Pat. No. 2,003,080) or in conjunction with the extrusion die itself (see, e.g., U.S. Pat. Nos. 3,393,427 and 4,088,434 and U.S.S.R. Pat. No. 592,610). These die units are very expensive to begin with and even more expensive to modify in this manner. Furthermore, they are not effective heat exchange elements, and therefore do not permit significant increases in throughput.

It is also possible to increase the amount of cooling capacity downstream of the extrusion die. See, e.g., U.S. Pat. No. 3,764,642. However, this gives rise to the problem of thermal shock, mentioned above, and moreover, the most essential cooling often is required upstream of the die orifice in order that the resin can be extruded within a certain required temperature range. This is essential in the case of foam extrusion.

Other attempts have been made to interpose some sort of a cooling device between the extruder and the extrusion die. See, e.g., U.S. Pat. Nos. 3,310,617, 3,275,731, 3,751,377, 3,558,955, 3,827,841 and 3,830,901. These efforts have indeed increased the total heat exchange or cooling capacity of the extrusion line; however, they have not been successful in solving the problem of temperature uniformity, as evidenced, for example, by the need to include an additional mixing device downstream of the heat exchange or cooling device, e.g., in the U.S Pat. No. 3,558,955, FIG. 3. Furthermore, while some increase in throughput has been accomplished (see, e.g., U.S. Pat. No. 3,827,841) by these prior measures, it has not been possible to achieve such increases above a certain level, while at the same time producing a foamed product having the desired physical properties.

An extrusion apparatus for thermoplastic compositions is therefore needed which will simultaneously permit increased throughput through the extruder and not result in deterioration of the physical properties of the extruded product. An apparatus is particularly needed which will permit the extrusion of foamed thermoplastic compositions at increased production rates with excellent physical properties, preferably by means of an extruder employing a single screw.

SUMMARY OF THE INVENTION

It is therefore an object of the present invention to provide an improved apparatus for extruding thermoplastic resinous materials.

It is also an object of the invention to provide a heat exchange apparatus which enables significantly increased throughputs of resinous material through the extrusion line, preferably with the use of a single screw-type extruder.

A further object of the invention resides in providing such a heat exchange apparatus which enables not only increased throughputs in material but also the production of extruded products having excellent physical properties.

Still another object of the invention is the provision of an apparatus which can control the temperature of an extruded material within narrowly determined limits.

In accomplishing the foregoing objects, there has been provided in accordance with the present invention a heat exchange device for controlling the temperature of a resin after leaving an extruder and prior to extrusion through a die in an extrusion process, comprising a heat exchanger having an inlet and outlet for an extruded heat-plastified resin and an inlet and an outlet for a heat exchange medium to be circulated in heat exchanging relationship with the extruded resin; a selective heater for receiving the heat exchange medium from the heat exchanger, the heater heating the heat exchange medium to a predetermined temperature during a start-up phase of the heat exchange device; a cooler adapted for receiving a portion of the heat exchange medium from the heater, the cooler including an inlet and an outlet for the heat exchange medium and an inlet and an outlet for a cooling medium to be circulated in heat exchanging relationship with the heat exchange medium; control means interposed between the heater and the cooler for selectively directing a portion of the heat exchange medium to the cooler in response to a sensed temperature condition and for directing the balance of the heat exchange medium to the heat exchanger; and a pump for circulating the heat exchange medium between the heat exchanger, the heater, the cooler and the control means.

Further objects, features and advantages of the present invention will become apparent from the detailed description of preferred embodiments when considered in view of the figures of drawings which follow.

BRIEF DESCRIPTION OF THE DRAWINGS

The invention will be explained in further detail with reference to the accompanying drawings, wherein like reference characters denote like parts in all views and wherein.

DETAILED DESCRIPTION OF PREFERRED EMBODIMENT

Figure 1:
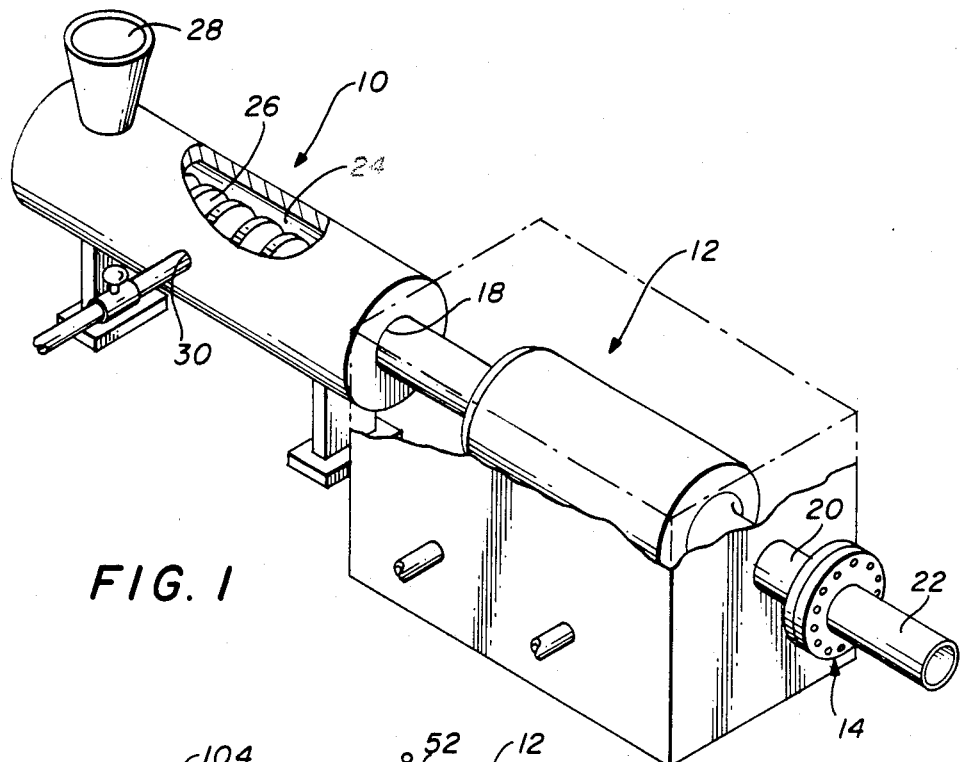
FIG. 1 is a simplified perspective view of apparatus for extruding foamed thermoplastic compositions.

Referring to the drawing and to FIG. 1 in particular, shown therein is an extruder 10, a heat exchange apparatus 12 that is constructed in accordance with the invention, and an extrusion die 14. An inlet port 36 (see FIG. 2) of the heat exchange apparatus 12 is connected to an outlet port 18 of extruder 10, and the extrusion die 14 is connected to an outlet port 20 of the heat exchange apparatus 12. In this figure, a tubular shaped extruded product 22 is shown exiting from the die 14.

Extruder 10 has been partially cut away to reveal a barrel 24 having a single extruder screw 26 positioned therein in such a manner that the screw 26 is rotatable about its longitudinal axis. Thermoplastic material is introduced into extruder 10 through a feed port or hopper 28. When producing foamed thermoplastic compositions, a blowing agent (not shown) is introduced through a blowing agent inlet port 30 into the barrel 26 around the extruder screw 26. Extruder 10 is a conventional motor-driven, single stage, screw-type extruder that is commercially available and well known to those of ordinary skill in the art.

Figure 2:
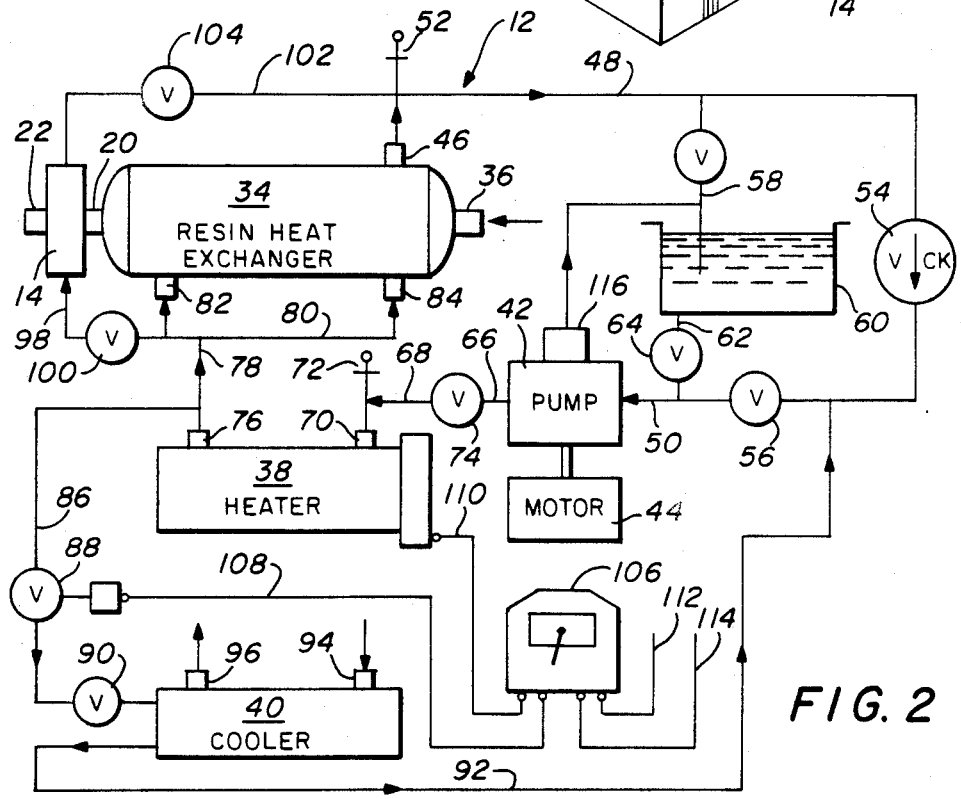
FIG. 2 is a schematic view of heat exchange apparatus constructed in accordance with the invention.

FIG. 2 is a detailed schematic view of the heat exchange apparatus 12. The heat exchange apparatus 12 includes a resin heat exchanger 34 having the inlet port 36 connected to and positioned downstream of the extruder 10. The outlet port 20 that leads from the exchanger 34 is connected to the extrusion die 14. The heat exchange apparatus 12 also includes a heater 38 and cooler 40 that provide temperature control for the exchange medium (not shown) that is cycled through the exchanger 34.

While the exchange medium may be selected from any appropriate liquid having a boiling point higher than the melt point of the hot resin being introduced into the exchanger, a preferred medium is oil, such as Monsanto, Thermanol 55, as discussed below.

Referring to FIG. 2 in detail, it can be seen that the heat exchange apparatus 12 includes a pump 42 that is driven by a suitable motor 44. An oil outlet 46 on the exchanger 34 is connected by a conduit 48 with an inlet 50 of the pump 42. Interposed in this conduit is a thermocouple fitting 52 that is used to sense the temperature of the oil leaving the heat exchanger 34, a check valve 54 which permits flow in the direction only from the outlet 46 to the inlet 50 of the pump 42, and a control valve 56. Teeing off of the conduit 48 is a conduit 58 that extends from the conduit 48 to a reservoir 60. From the reservoir 60, a conduit 62 extends into connection with the conduit 48 adjacent to the inlet 50 of the pump 42. Interposed in this line is a valve 64 that can be utilized to control flow from the reservoir 60 to the pump inlet 50.

An outlet 66 of the pump 42 is connected by a conduit 68 to an oil inlet 70 of the heater 38. Interposed in the conduit 68 is a second thermocouple fitting 72 and a control valve 74 that can be utilized to prevent flow from the pump 42 to the heater 38 through the conduit 68.

The heater 38 also includes an outlet 76 that is connected by conduits 78 and 80 to inlets 82 and 84 of the heat exchanger 34. A branch conduit 86 extends from the outlet 76 of the heat exchanger 38 to the cooler 40. Interposed in the conduit 86 is a solenoid-actuated, control valve 88 and a manual valve 90.

A conduit 92 extends from the cooler 40 into connection with the conduit 48 between the check valve 54 and the valve 56. The cooler 40 also includes an inlet 94 and an outlet 96 that are generally arranged to provide a supply of cold or cool water for purposes that will appear hereinafter.

The die 14, if desired, and, as shown, is connected into the oil circuit and into conduit 80 by a conduit 98 that has a control valve 100 located therein. The outlet from the die 14 is connected by a conduit 102 to the conduit 48 which has been previously described. A control valve 104 is interposed in the conduit 102 so that the control valves 100 and 104 can be utilized to control the volume of flow to and from the die 14.

The solenoid-actuated valve 88, the heating element (not shown) located in the heater 38, and the thermocouples 52 and 72 are interconnected to a control apparatus 106 by electrical conductors 108, 110, 112 and 114, respectively. It will, of course, be understood that the control circuit will be provided with the necessary electrical potential to effect the control desired.

On initial start-up, the electrical control 106 actuates the heating element in the heater 38 to produce an oil temperature capable of melting any solidified resin remaining in the heat exchange apparatus 12 from a previous operation. Oil is pumped by pump 42 through the heater 38, exiting through conduits 78 and 80 to the resin heat exchanger 34.

A desired proportion of the hot oil may be pumped through conduit 98 to the extrusion die 14 where it will heat the extrusion die to a temperature sufficient to melt any resin residue remaining therein from the previous use. The relative proportion of the hot oil to the die 14 and the exchanger 34 varies according to operating conditions. However, in a typical operation about 90% or more of hot oil flows to the resin heat exchanger 34 through conduit 80 while 10% or less is pumped to the extrusion die 14 through conduit 98. The amount of oil flowing to the extrusion die 12 is only exemplary. The oil may be blocked by closing valve 100, and therefore, all the oil may flow to the exchanger 34 through conduit 80. The valves 100 and 104 may also serve as separating valves permitting the on-line separation of conduit 80 from the extrusion die 14 should flow to the die no longer be desired. By the incorporation of the valves 100 and 104, the separation can be accomplished without having to drain the entire system prior to the separation.

Oil is pumped to the resin heat exchanger 34 wherein it flows in relation to the resin flow in such a manner as to establish heat transfer. Preferably, the oil flows countercurrently to the resin, thus providing greater heat transfer. As the resin begins to melt, it flows through the resin heat exchanger 34 to the extrusion die 14. The hot oil, being the source of higher temperature medium, transfers heat to the cold solidified resin. Due to this heat transfer, the hot oil leaving the exchanger 34 through conduit 48 has been cooled. The cooler oil finishes its cycle by returning through the pump 42 to the heater 38 where it is again heated, and the cycle is repeated.

Once resin flow is established, a lower setting on the temperature control 106 is possible, and when this occurs, establishment of on-line production is possible.

When on-line production is established, the heat exchanger system 12 functions to provide for the removal of heat from the hot resin leaving the extruder 10 and to further provide for the accurate control of the resin to a predetermined temperature. Once hot resin begins to flow through the exchanger 34, the oil temperature controller 106 shuts off the heating element in heater 38. The heat exchanger system 12 now functions to provide cooler oil flow into the resin exchanger 34.

Referring to the oil flow cycle, hot oil exits from the resin exchanger 34 through conduit 48 near the resin inlet 36. The oil, upon countercurrent passage through the exchanger has now functioned as a heat sink to remove heat from the resin melt, the heat source, and as a result, the oil temperature is increased. The hot oil is then transported through conduit 48 via pump 42 to the heater 38. The passage through conduit 48 provides for some heat exchange between the hot oil and the atmosphere. Since the oil may vary in the hundreds of degrees Centigrade compared to ambient conditions in the range of from about 10° to 40° C., the oil-to-ambient air contact provides for a major heat exchange environment. Heat exchange with the air can produce up to about 90-95% of the required total heat removal from the oil. This type of exchange characteristically occurs throughout the system, with the oil return conduit 48 being only one example.

As previously mentioned, the heating element in the heater 38 has been shut off; however, passage of the oil through the heater 38 guards the oil against thermal shock due to residual heat remaining in the heater. The oil, partially cooled due to ambient heat exchange, exits the heater 38 and part of the oil flows through conduit 86 to the oil cooler 40 and a major proportion proceeding through conduits 78 and 80 returning to the resin exchanger 34.

The relative proportion of the oil permitted to flow to the oil cooler 40 is determined by the solenoid valve 88 in accordance with signals from the oil temperature control 106. The relative proportions vary according to the process conditions. However, the amount of oil flowing to the resin heat exchanger 34 generally varies from about 80-95%, with at least a 90% being preferred. This means that only a small load is placed upon the external cooling source, such as the cooling water supplied to cooler 40. The minor proportion of the hot oil flowing through conduit 86 and solenoid valve 88 to the oil cooler 40 is cooled in the cooler 40.

Any convenient heat exchange medium for the cooler 40 may be chosen, with water being preferred. The exchange medium enters the oil cooler 40 through inlet 94 at a cool temperature relative to the hot oil and will absorb the heat from the oil and subsequently be discharged via outlet 96 to a cooling device, e.g., a cooling tower (not shown). The cooled oil exits the oil cooler 40 through conduit 92 and unites with the oil returning to the pump 42 via the conduit 48.

The oil circulated to the extrusion die 14 functions to control the temperature of the extrusion die, particularly to remove any heat buildup resulting from the extrusion process. Because the oil flow returning from the extrusion die 14 is minor in comparison to the rest of the oil flow and the temperature of the resin melt is lower at the extrusion die in comparison to the resin melt upon passage through the resin heat exchanger, and because of ambient air-to-oil heat exchange, the introduction of the oil from the die 14 via conduit 102 does not markedly affect the temperature of the oil in conduit 92 flowing from the oil cooler 40.

Alternately, cooler oil from the conduit 92 is united with the hot oil in conduit 48. Combining the flows from conduits 92 and 48 functions to cool the hot oil in conduit 48 and the combined stream is returned through the pump 42 to the heater 38 whereupon the cycle is repeated.

Oil reservoir 60 provides for the addition of oil when required. This may be necessary either due to loss of oil through leaks or to further cool the hot oil being circulated from the exchanger.

Additionally, the pressure relief valve 116 is actuated if a pressure buildup occurs in the system. This typically occurs during start-up, when the melting of the cold resin results in increased oil pressure. The system typically operates at oil pressures in the range of from about 60–80 psi. Cold start-up pressures may reach about 85 psi. These values will vary according to the type of material being extruded, as well as the cooling medium being used. The pressure of the inlet melt may range up to about 5000 psi during start-up. If excessive presure in excess of 5000 psi is encountered, a higher temperature in the oil will be effected by means of the oil temperature control 106.

Once a temperature-stable process is established, the heat exchange system 12 operates to control the temperature of the exiting resin melt within very narrowly defined temperature ranges. For example, if a higher temperature resin melt is indicated as exiting the exchanger 34, the oil temperature control 106 is actuated and more coolant oil is provided. The solenoid valve 88 is controlled by temperature control 106 to allow more oil to be introduced into the oil cooler 40 depending on the discharge temperature. The oil is then mixed with oil in conduit 48 and returned to the resin exchanger 34 to increase the heat transfer ability of the exchanger 34 by means of cooler oil flowing therethrough.

In the opposite case, if the resin exiting the exchanger 34 is cooler than required, the oil temperature control 106 actuates the solenoid valve 88 to reduce the flow of oil through the cooler 40, thereby reducing the heat transfer capacity in the exchanger 34 and increasing the temperature of the resulting melt. The oil temperature is continually monitored at thermocouples 52 and 72 by the oil temperature control 106 to assure correct oil temperature.

The resin temperature control system thus provides for the establishment of a near-uniform temperature of the resin melt. This control is possible to an accuracy of about ±1° or 2° F. This control also provides for a constant temperature gradient across the resulting resin melt. This improves the dimensional stability and results in smaller cell size in the case of an expanded resin.

The amount of heat removed varies according to the process conditions; however, generally, the exchanger has demonstrated that up to 150,000 BTU/hr, or approximately 7,600 BTU/hr/sq. ft. of exchange surface, can be effectively removed from the resin melt. Process flow temperature reductions of from about 200°–300° F. can be expected as a result of the present heat exchange apparatus.

Referring again to FIG. 1, outlet port 20 from resin heat exchanger 34 is connected to and communicates with extrusion die 14. Upon exiting resin exchanger 34, the cooled thermoplastic composition is directed through extrusion die 14. In the case of extruding resin compositions containing a blowing agent, the extruded profile undergoes rapid expansion upon exiting the die 14. Expansion of extrudate 22 occurs since the extrudate is exposed to atmospheric upon exiting extrusion die 14, permitting the blowing agent to expand around each nucleator particle, thereby forming the individual cells. While extrudate 22 is shown in FIG. 1 as a foamed thermoplastic tube, it will be readily understood that the shape and dimensions of extrudate 22 can be varied to any desired configuration by the substitution of a different extrusion die.

Therefore, in accordance with the present invention, it is possible to run the extruder at a very high speed. This not only increases the throughput of the extruder line, but has the added benefit of producing an improved foamed product, i.e., a product with a more uniform cell size distribution because of improved dispersion of the blowing agent throughout the polymer.

By virtue of the increased efficiency in the resin exchange system constructed according to the invention, the polymer can be brought to very uniform temperature. This is extremely advantageous in a process for producing foamed thermoplastic products, since the resulting uniformity of temperatures produces an improved product having a uniform density and cell structure.

With these foregoing features, the apparatus according to the invention is especially well suited for extruding foamed products from thermoplastic polymers which require close temperature control and uniformity just prior to being passed through the extrusion die orifice.

By employing the apparatus described herein, it is possible to achieve throughput rates greater than those previously experienced through use of a conventional extrusion apparatus. Furthermore, the subject apparatus permits the production of foamed thermoplastic compositions having significantly lower densities, smaller average cell size and more uniformity of cell size than those which can be made by conventional methods.

While this invention has been described in relation to its preferred embodiment, it is to be understood that various modifications can be made hereto, and it is intended to cover all such modifications as fall within the scope of the appended claims.

What is claimed is:

1. Heat exchange apparatus for controlling the temperature of an extruded heat-plastified resin after leaving the extruder and prior to extrusion through a die in an extrusion process, comprising:

a heat exchanger having an inlet and an outlet for the extruded heat-plastified resin and inlet and an outlet for a heat exchange medium to be circulated in a heat exchanging relationship with the extruded resin;

a selective heater connected with said exchanger and receiving the heat exchange medium from said heat exchanger, said heater heating the heat exchange medium to a predetermined temperature;

a cooler including an inlet connected to said heater upstream of said heat exchanger for receiving a portion of the heat exchange medium from said heater, said cooler including an outlet for the heat exchange medium and an inlet and an outlet for a cooling medium to be circulated in heat exchanging relationship with the heat exchange medium;

temperature sensing means for transmitting a signal proportional to the temperature of said heat exchange medium;

control means between said heater and said cooler for selectively directing a portion of the heat exchange medium to said cooler in response to said temperature signal and for directing the balance of the heat exchange medium to said heat exchanger;

a pump having an inlet connected to the outlet for said heat exchange medium in said heat exchanger and to the outlet for said heating exchange medium in said cooler and having an outlet connected to the inlet for said heat exchange medium in said heater for circulating the heat exchange medium among said heat exchanger, said heater and said cooler; and conduit means for connecting said pump, heat exchanger, heater and cooler and for carrying said heat exchange medium among said pump, heat exchanger, heater and cooler.

2. A heat exchange device as claimed in claim 1 wherein said control means dividing said heat exchange medium to said cooler and heat exchanger is arranged to supply more than 50% of the heat exchange medium to said heat exchanger.

3. A heat exchange device as claimed in claim 1, wherein said control means directing said heat exchange medium to said cooler and heat exchanger supplies 90% of the heat exchange medium to said heat exchanger.

4. Heat exchange apparatus for controlling the temperature of an extruded heat-plastified resin after leaving an extruder and prior to extrusion through a die in an extrusion process, comprising:

a heat exchanger having an inlet and an outlet for the extruded heat-plastified resin and an inlet and an outlet for a heat exchange medium to be circulated in heat exchanging relationship with the extruded resin;

a selective heater connected with said exchanger and receiving the heat exchange medium from said heat exchanger, said heater heating the heat exchange medium to a predetermined temperature;

a cooler including an inlet connected to said heater upstream of said heat exchanger for receiving a portion of the heat exchange medium from said heater, said cooler including an outlet for the heat exchange medium and an inlet and an outlet for a cooling medium to be circulated in heat exchanging relationship with the heat exchange medium;

tempertaure sensing means for transmitting a signal proprotional to the temperature of said heat exchange medium;

control means between said heater and said cooler for selectively directing a portion of the heat exchange medium to said cooler in response to said temperature signal and for directing the balance of the heat exchange medium to said heat exchanger;

a pump having an inlet connected to the outlet for said heat exchange medium in said heat exchanger and to the outlet for said heat exchange medium in said cooler and having an outlet connected to the inlet for said heat exchange medium in said heater for circulating the heat exchange medium among said heat exchanger, said heater and said cooler;

conduit means for connecting said pump, heat exchanger, heater and cooler and for carrying said heat exchange medium among said pump, heat exchanger, heater and cooler; and, means for separating the circulating heat exchange medium into two streams entering said heat exchanger to increase the efficiency of said exchanger.

5. Heat exchange apparatus for controlling the temperature of an extruded heat-plastified resin after leaving an extruder and prior to extrusion through a die in an extrusion process, comprising:

a heat exchanger having an inlet and an outlet for the extruded heat-plastified resin and an inlet and an outlet for a heat exchange medium to be circulated in heat exchanging relationship with the extruded resin;

a selective heater connected with said exchanger and receiving the heat exchange medium from said heat exchanger, said heater being adapted for heating the heat exchange medium to a predetermined temperature;

a cooler including an inlet connected to said heater upstream of said heat exchanger for receiving a portion of the heat exchange medium from said heater, said cooler including an outlet for the heat exchange medium and an inlet and an outlet for a cooling medium to be circulated in heat exchanging relationship with the heat exchange medium;

temperature sensing means for transmitting a signal proprotional to the temperature of said heat exchange medium;

control means between said heater and said cooler for selectively directing a portion of the heat exchange medium to said cooler in response to said temperature signal and for directing the balance of the heat exchange medium to said heat exchanger;

a pump having an inlet connected to the outlet for said heat exchange medium in said heat exchanger and to the outlet for said heat exchange medium in said cooler and having an outlet connected to the inlet for said heat exchange medium in said heater for circulating the heat exchange medium among said heat exchanger, said heater and said cooler;

means for connecting the inlet and outlet for the heat exchange medium from said heat exchanger to said die whereby the heat exchange medium is circulated through said die and heat is applied to the die; and, conduit means for connecting the pump, heat exchanger, die, heater and cooler and for carrying said heat exchange medium among said pump, heat exchanger, die, heater and cooler.

* * * * *